United States Patent [19]
Brosius

[11] Patent Number: 4,744,443
[45] Date of Patent: May 17, 1988

[54] HYDRODYNAMIC RETARDER

[76] Inventor: Klaus Brosius, Kistelbergstr. 58, 7920 Heidenhemm, Fed. Rep. of Germany

[21] Appl. No.: 911,490

[22] Filed: Sep. 24, 1986

[30] Foreign Application Priority Data

Oct. 4, 1985 [DE] Fed. Rep. of Germany ....... 3535494

[51] Int. Cl.[4] ............................................. F16D 57/02
[52] U.S. Cl. .................................... 188/292; 188/294
[58] Field of Search ........................ 188/292, 294, 290

[56] References Cited

U.S. PATENT DOCUMENTS 3,481,148 12/1969 Muller et al. .
4,440,272 4/1984 Bieber ................................ 188/290

FOREIGN PATENT DOCUMENTS 1600191 3/1970 Fed. Rep. of Germany .
1480317 5/1971 Fed. Rep. of Germany .
3229951 2/1984 Fed. Rep. of Germany ...... 188/290

Primary Examiner—Joseph Falk
Attorney, Agent, or Firm—Jeffers, Hoffman & Niewyk

[57] ABSTRACT

A hydrodynamic retarder is revealed having a rotor blade wheel and a stator blade wheel each with two different types of blading, i.e. an inner blading enclosed by an outer blading. The two blade rings are provided with blades inclined in opposite directions. This allows said retarder to be operated in both directions of rotation. A particularly advantageous development of the invention is that the retarder is operated as a counter-rotating retarder, whereby the stator is rotated in the opposite direction by means of a reversing gear. Thus, a vehicle can be hydrodynamically braked almost to standstill. When integrating the retarder into a rail vehicle, the rotor can be driven by the wheel sets separately from the stator. An identical braking effect is obtained in both directions of travel. Moreover, the inner working circuit enclosed by the outer working circuit can be arranged radially in such a manner that the radially outer front cross-sectional area for the fluid flow is of identical size as the radially inner front cross-sectional area. This prevents shock losses and increases the braking power of the retarder.

19 Claims, 2 Drawing Sheets

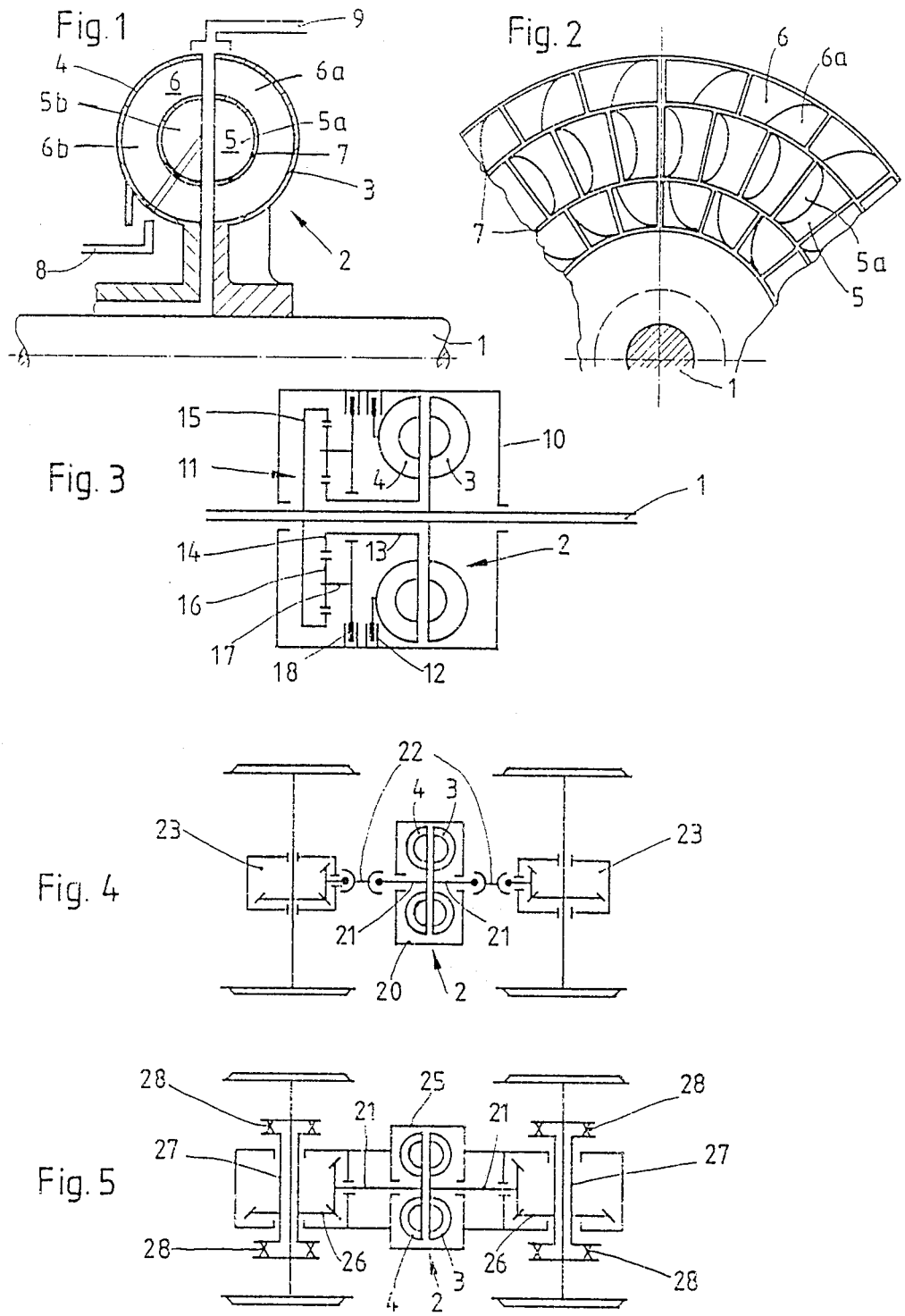

HYDRODYNAMIC RETARDER

This invention relates to a hydrodynamic retarder having a primary blade wheel, a secondary blade wheel and several blade rings forming several working circuits.

Reference manual DE-AS No. 1 480 317 discloses a retarder in which several rotor and stator blade rings are arranged on a drive shaft radially one above each other. Said retrder is however not suited to the same extent for rotation in both directions. This retarder is designed to produce a brake torque which will remain constant as possible, even at low rpms. The working circuit represented are of identical size and are actuated by filling, in sequence but not simultaneously, controlled by valves as a function of speed. With this mode of operation, the retarder is not optimally employed and, in relation to the obtainable brake torque, is very large in size.

The invention is based on the problem of creating a hydrodynamic retarder equally suited for both directions of rotation, with the smallest possible space requirements, of simple constructional design and with a simple control mechanism.

This problem is solved by the features disclosed herein. Reference manual DE-AS No. 1 600 191 also discloses a retarder which is supposed to solve said problem. Within the retarder, two working circuits are axially arranged adjacent to each other. Each working circuit is provided with blades inclined at an angle. Through the appropriate selection of the angle of blade incline, one of the working circuits generates a maximum brake torque in its preferred direction of rotation, whereas the other circuit only provides a reduced braking effect. Due to the overall axial length, said design is not appropriate in many applications. The manufacture of said retarder is relatively expensive since several components need to be provided with blades. In the construction of the retarder according to the invention, the primary and secondary blade wheels are provided with two different types of blading which, as disclosed, are not arranged axially adjacent to each other, or radially above each other, but concentrically, one within the other. The inventor has perceived that, under certain conditions, a cavity remaining empty of fluid is formed in a retarder at the center of the working circuit. The size of the cavity is greater, the greater the cross-section of the working circuit is. The invention consists in the application of a further blade ring in said cavity. Said blade ring can be provided with blades inclined in the opposite direction. A retarder thus equipped with double blading is then capable of generating a brake torque in both directions. The cross-sectional area of the inner working circuit determines the magnitude of the brake torque. The outer and inner diameters of the outer working circuit enclosing the inner working circuit are therefore selected in such a way that the two working circuits both generate at least approximately the same brake torque in the preferred direction of rotation governed by the incline of the blades. Each working circuit generates a reduced brake torque in the direction of rotation preferred by the other working circuit. This results in the common generation of a brake torque composed of two parts.

The preferred embodiments of the invention are contained herein. A preferred further development of the invention is characterized in that the retarder according to this invention is a component part of a counter-rotating retarder construction. In accordance with claim 5, the secondary blade wheel in said construction is allowed to rotate, whereby it can on the one hand be attached to a housing via one first lock brake, on the other hand it is attached to a reversing mechanism which can reverse the secondary blade wheel in the opposite direction of rotation by actuating a coupling mechanism. This exploits all the advantages of the retarder:

(a) operation of retarder with locked secondary blade wheel (stator) from high speeds to peak of filling parabolic curve;

(b) operation of retarder with secondary blade wheel rotating in opposite direction (counter-rotating stator) down to zero speed;

(c) due to blade configuration in the retarder according to the invention, said retarder can be operated to an equal and unlimited extent in either direction.

A further preferred development of the retarder resides in the fact that the retarder is integrated in the brake system of a vehicle, preferably a rail vehicle. In this case, said retarder is employed again as a counter-rotating retarder. It is fitted into the vehicle in such a way that the primary and secondary blade wheels are driven separately in opposite directions by two wheel sets. The advantage is again that the retarder also generates the same brake torque when rotating in the opposite direction. The retarder can be either mounted in the vehicle via a separate retarder housing and driven by known level gears via cardan shafts, or said retarder can be mounted in a housing receiving both the retarder and the two axle gears, whereby the housing is supported as already disclosed by the shafts of the wheel sets via hollow shafts and elastic connecting links. In contrast to known retarder systems, said counter-rotating retarder arrangement in accordance with the invention requires no separate torque supports.

A preferred further development of the invention consists in arranging the blading of the inner working circuit within the area formed by the outer diameter of the outer working circuit in such a way that the front radial outer ring cross-section is equal to the radial inner ring cross-section adjacent to the shaft. In other words, the ring cross-sectional area defined by the outer diameters of the outer and inner operating chambers is designed to be the same size as the ringcross-sectional area defined by the inner diameters of the outer and inner working chambers. This means that the inner operating chamber is radially and unsymmetrically displaced outwards, i.e. the radial difference between the outer diameters of the two operating chambers is smaller than the radial difference of the inner diameters. This has the effect that the flow of fluid entering and leaving the blade wheel has at least approximately the same speed. It also prevents a loss of brake power caused by the flow being continually decelerated and re-accelerated during rotation and by the continuous alternation of the flow from one blade wheel to the other. If, in accordance with a preferred embodiment, the transition from input port cross-section into the blade wheel to the output port cross-section is designed in such a way that the space filled by the flow of fluid has a constant cross-sectional area along a thread of stream, the favorable result will be a freedom from jerking at maximum brake power. This will also apply if the output port cross-sectional area in one blade wheel is the same size as the input port cross-sectional area in the blading of the wheel opposite.

It is self-evident that the retarder according to the invention is preferably provided with mechanisms to prevent or reduce losses due to air ventilation in the disconnected state. These can also consist in the stator wheel not being provided with a tight connection to the housing when the retarder is evacuated, or not being driven in the opposite direction to the rotor by a reversing mechanism. On the contrary, the stator wheel can be provided with a rotatable arrangement and a coupling mechanism, allowing the stator wheel to freely rotate. Thus, as a result of air ventilation, the stator wheel is capable of following the rotation of the rotor with practically no losses. Within the scope of the invention, it is also possible not to arrange the inner working circuit within the blading of the outer working circuit: The former can be displaced radially outside of the outer working circuit.

The invention is illustrated in more detail in Figures showing several application examples.

FIG. 1 portrays a schematic longitudinal section through the retarder;

FIG. 2 shows a front view of a blade wheel;

FIG. 3 shows the schematic representation of a retarder in a counter-rotating stator configuration;

Figure 6:
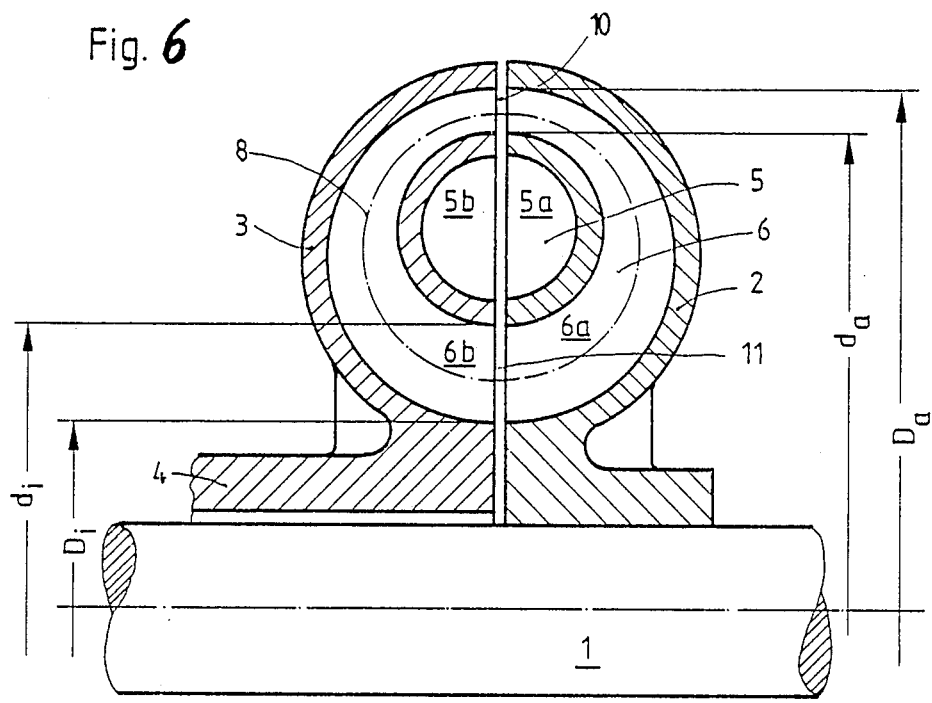
Figure 7:
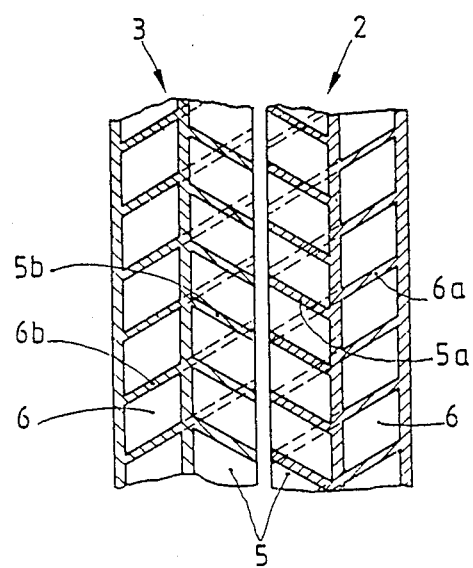

FIG. 4 portrays a retarder applied as the brake of a rail vehicle;

FIG. 5 portrays a retarder applied as the brake of a rail vehicle mounted in a common housing with the axle gears;

FIG. 6 shows a longitudinal section through a retarder;

FIG. 7 is a cylindrical section projection of the blading.

In all Figures, identical parts are annotated with identical reference numbers. FIG. 1 shows a retarder 2, consisting of a primary blade wheel 3 (rotor) and a secondary blade wheel 4 (stator), driven by a drive shaft 1. The two blade wheels are each provided with two types of blading, i.e. an inner blading 5a, 5b, enclosed by an outer blading 6a, 6b. The two bladings are separated by a dividing wall 7. The retarder is preferably filled via a supply line 8, leading from the vicinity of the axle outside of the retarder to the center of the inner working circuit 5 and continually filling the two working circuits 5, 6. The two working circuits are also evacuated by a common evacuation line 9.

FIG. 2 shows a front view of a blade wheel in accordance with the invention. The inclined blades 6a of the outer working circuit 6 can be seen as well as the inner blades 5a, arranged at the opposite angle of inclination, and the dividing wall 7 between the two blade sections. The Figure also shows that the number of inner blades 5a is greater than that of the outer blades 6a. A greater number of blades can be fitted to the inner blade wheel 5 due to the lesser axial depth of the inner blades 5a. Naturally, in divergence herefrom, the number of inner blades can be made identical to that of the outer blades.

FIG. 3 depicts a retarder 2 whose rotor 3 is driven by the drive shaft 1 and whose stator 4 is arranged so that it can rotate. The retarder is mounted in a housing 10 in which a reversing gear 11 is also located. The stator 4 can be tightly connected via a first lock brake 12 to the housing 10; furthermore, said stator is connected via a hollow shaft 13 to the sun gear 14 of a reversing gear 11 in the form of a planetary mechanism. The internal gear 15 of the gear mechanism 11 is secured tightly to the drive shaft 1. The planetary gears 16 themselves are connected via planet carrier 17 to a second lock brake 18 which is attached to the housing 10.

A braking procedure occurs as follows: The first lock brake 12 for the stator 4 is actuated at the start of the braking procedure, while the second lock brake 18 is released. Once operating fluid has started to fill the retarder, the vehicle is decelerated in the known way by a known regulating mechanism. When the retarder is completely filled at a specific low speed corresponding to the so-called total filling parabola, the first lock brake 12 is released and the second lock brake 18 is actuated. This rotates the stator in the opposite direction to that of the drive shaft 1. Said counter-rotation generates a high brake force which remains until the speed has reached zero. This retarder construction allows operation with identical characteristic curves in both directions of rotation.

FIG. 4 depicts a retarder employed as the braking system of a rail vehicle. The retarder 2 is mounted in a housing 20. The rotor 3 and the stator 4 are each driven by separate drive shafts 21 which are connected to the axle gears 23 by cardan shafts 22. The retarder housing 20 can be mounted in the sprung part of the bogie or vehicle. No special provisions are required with respect to supporting a reaction torque since the cardan shafts 22 and the drive shafts 21 rotate in opposite directions and transfer the identical torque, which in effect provides full torque compensation.

FIG. 5 illustrates a further development of the configuration shown in FIG. 4. The retarder 2 is mounted in a housing 25, additionally containing the two axle-gear units 26. The two drive shafts 21 of the rotor and stator directly support the two bevel pinions of the axle gears, whereas the ring gears are secured on hollow shafts 27. The hollow shafts enclose in a conventional manner the wheel set shafts, to which they are connected by elastic connecting links 28.

FIG. 6 represents a retarder, corresponding in principle to that depicted in FIG. 1.

The clear outer diameter of the outer working circuit profile is designated $D_a$ and the clear inner diameter, $D_i$. The corresponding OD of the inner working circuit, measured across wall 7, is $d_a$ and the ID, $d_i$. The radial position of the inner working circuit 5 is selected so that the front ring area 10 defined by the ODS $D_a$ and $d_a$ at the output and input ports to the blade wheel is of identical size to the front area 11 defined by the IDs $D_i$ and $d_i$ at the radially inner input and output ports to the blade wheel. This ensures that the velocity of flow of the working fluid entering and leaving the blade wheel is identical. A preferred development of the invention provides that, along a thread of stream 8, i.e. along an ideal axis of flow through the blade channel, the flow cross-sections are designed to be constant in such manner that the working fluid in its path between the input port to the blading and the output port is neither subject to deceleration nor acceleration. This prevents shock losses and can lead to an increase in brake power generated. This applies in particular when there is also no change in cross-section of the fluid while flowing from one wheel to the blading of the opposite wheel.

FIG. 7 shows a cylindrical section of the blading. The arrangement of the blades for the two directions of rotation and associated angles of inclination are depicted.

What is claimed is:

1. A hydrodynamic retarder comprising:

a primary blade wheel and a secondary blade wheel mounted for rotation relative to one another about a common axis, each of said primary and secondary blade wheels including an outer annular semi-toroidal blade ring and an inner annular semi-toroidal blade ring, the outer annular semi-toroidal blade rings facing one another and cooperating to define an outer toroidal working circuit capable of being filled with a working fluid, the inner annular semi-toroidal blade rings facing one another and cooperating to define an inner toroidal working circuit disposed within the outer toroidal working circuit and capable of being filled with a working fluid, the outer annular semi-toroidal blade rings including blades inclined in a first direction relative to an axial plane, the inner annular semi-toroidal blade rings including blades inclined in a second direction relative to an axial plane;

primary shaft means connected to said primary blade wheels for rotation therewith;

secondary shaft means connected to said secondary blade wheel for rotation therewith;

working fluid means for selectively filling and emptying said inner and outer toroidal working circuits with a working fluid suitable for coupling said primary blade wheel to said secondary blade wheel for the transfer of energy therebetween;

the facial surface area and the blade size and inclination of the outer annular semi-toroidal blade rings being selected with respect to the facial surface area and the blade size and inclination of the inner annular semi-toroidal blade rings such that the energy transfer of the outer toroidal working circuit is approximately equal to the energy transfer of the inner toroidal working circuit, and the energy transfer between said primary and secondary blade wheels is approximately equal in both directions of relative rotation.

2. The hydrodynamic retarder of claim 1, in which said working fluid means includes common supply and evacuation lines to fill and empty the inner and outer toroidal working circuits in parallel.

3. The hydrodynamic retarder of claim 2, in which the supply line runs from the vicinity of the axis in the region of one of the blade wheels to the center of the cross-section of the inner toroidal working circuit and the evacuation line is located at the outer circumference of the blade wheels.

4. The hydrodynamic retarder of claim 3, further including a wheeled vehicle having at least two wheel sets, said primary shaft means being driven by at least one wheel set and said secondary shaft means being driven by at least one other wheel set such that said primary and secondary blade wheels rotate in opposite directions.

5. The hydrodynamic retarder of claim 4, and further including a housing attached longitudinally to the vehicle, one of said wheel sets including first axle gears connected to said primary shaft means via a first cardan shaft, the other of said wheel sets including second axle gears connected to said secondary shaft means via a second cardan shaft, with both the primary and secondary blade wheels mounted in said housing.

6. The hydrodynamic retarder of claim 2, further including a wheeled vehicle having at least two wheel sets, said primary shaft means being driven by at least one wheel set and said second shaft means being driven by at least one other wheel set such that said primary and secondary blade wheels rotate in opposite directions.

7. The hydrodynamic retarder of claim 6, and further including a housing attached longitudinally to the vehicle, one of said wheel sets including first axle gears connected to said primary shaft means via a first cardan shaft, the other of said wheel sets including second axle gears connected to said secondary shaft means via a second cardan shaft, with both the primary and secondary blade wheels mounted in said housing.

8. The hydrodynamic retarder of claim 1, and further including reversing gear means interconnecting said primary shaft means and said secondary shaft means for rotating said secondary shaft means in driven engagement with said primary shaft means in a direction opposite said primary shaft means.

9. The hydrodynamic retarder of claim 8, in which said reversing gear means includes a planetary gear train having a sun gear connected for rotation with said secondary shaft means, a gear wheel connected for rotation with said primary shaft means, and planet gears intermeshing with the sun gear and the gear wheel, the planet gears mounted for rotation on a planet carrier, and further including a housing surrounding said primary and secondary blade wheels and said reversing gear means, a first lock brake means for selectively locking said secondary blade wheel to said housing, and a second lock brake means for selectively locking the planet carrier to said housing.

10. The hydrodynamic retarder of claim 9, in which the first and second lock brakes include a disk brake.

11. The hydrodynamic retarder of claim 9, in which the first lock brake means is locked upon initial actuation of the retarder, with the second lock brake means released, and subsequently the first lock brake means is released and the second lock brake is locked.

12. The hydrodynamic retarder of claim 1, further including a wheeled vehicle having at least two wheel sets, said primary shaft means being driven by at least one wheel set and said secondary shaft means being driven by at least one other wheel set such that said primary and secondary blade wheels rotate in opposite directions.

13. The hydrodynamic retarder of claim 12, and further including a housing attached longitudinally to the vehicle, one of said wheel sets including first axle gears connected to said primary shaft means via a first cardan shaft, the other of said wheel sets including second axle gears connected to said secondary shaft means via a second cardan shaft, with both the primary and secondary blade wheels mounted in said housing.

14. The hydrodynamic retarder of claim 12, and further including a housing attached longitudinally to the vehicle, one of said wheel sets including first axle gears connected to said primary shaft means, the other of said wheel sets including second axle gears connected to said secondary shaft means, with both the primary and secondary blade wheels and first and second axle gears mounted within said housing, the axle gears including pinion gears fixed to said respective primary and secondary shaft means and including ring gears attached to hollow shafts mounted in bearings in said housing and connected to the wheel sets via elastic connecting links.

15. The hydrodynamic retarder of claim 1, in which the center of the inner toroidal working circuit is radially displaced with respect to the center of the outer toroidal working circuit.

16. The hydrodynamic retarder of claim 1, in which the radial outer front cross-sectional area for the fluid flow formed by the outer diameters of the outer working circuit and the inner working circuit is of identical size as the radial inner front cross-sectional area defined by the inner diameters of the outer working circuit and the inner working circuit.

17. The hydrodynamic retarder of claim 16, in which the transition from the radial outer front cross-sectional area to the radial inner cross-sectional area and vice versa continually runs along a thread of stream.

18. The hydrodynamic retarder of claim 17, in which the radial outer cross-sectional areas and the radial inner cross-sectional areas are of the identical size for both blade wheels.

19. The hydrodynamic retarder of claim 16, in which the radial outer cross-sectional areas and the radial inner cross-sectional areas are of the identical size for both blade wheels.

* * * * *

UNITED STATES PATENT AND TRADEMARK OFFICE
CERTIFICATE OF CORRECTION

PATENT NO. : 4,744,443

DATED : May 17, 1988

INVENTOR(S) : Klaus Brosius

It is certified that error appears in the above-identified patent and that said Letters Patent is hereby corrected as shown below:

Claim 6, Col. 5, line 67, change "second" to --secondary--

Signed and Sealed this

Eighteenth Day of October, 1988

Attest:

DONALD J. QUIGG

Attesting Officer

Commissioner of Patents and Trademarks